United States Patent Office 3,594,325
Patented July 20, 1971

3,594,325
AGGLOMERATED ENZYME PRODUCTS
Harold E. Feierstein, Creve Coeur, Raymond L. Liss, Warson Woods, and Noel L. Schomburg, Florissant, Mo., assignors to Monsanto Company, St. Louis, Mo.
No Drawing. Filed Apr. 25, 1968, Ser. No. 724,269
Int. Cl. C11d 3/065
U.S. Cl. 252—138
11 Claims

ABSTRACT OF THE DISCLOSURE

The present invention relates to stable enzyme products composed of a mixture of enzymically active materials and a resinous binding agent. Said products are useful in detergents and are prepared by a novel agglomeration process.

This invention relates to new compositions of matter, processes for preparing the novel compositions of matter and to detergent formulations including the same. More specifically, the invention relates to agglomerated enzyme products prepared by agglomerating an enzymically active material.

Enzymes, commonly referred to as biological catalysts have been widely used in such areas as the textile, pharmaceutical, food and brewing industries. In the detergent field, enzymes are useful in removing various soils of a carbohydrate, fat or protein nature such as soils caused by dairy products, gravy, blood, perspiration and the like. Generally, the enzymes function to degrade or change the soil making it easier to remove. Washing products which include enzymes are either a pre-soaking product wherein the enzymes attack the soil prior to laundering or a detergent formulation wherein the enzymes act on the soil during the washing operation.

By using well-known fermentation techniques, enzymes can be obtained from micro-organisms in the form of finely divided solid particles or powders. Previous attempts to incorporate enzymes into a detergent have achieved only limited success either because the enzyme is rapidly inactivated and/or tends to separate.

It is, therefore, believed that finely divided solid enzymes in a form that is stable and can be added to a detergent so that it retains its activity and does not separate is an advancement in the art.

In accordance with this invention, an agglomerated enzyme product is prepared, in the form of particulate material in which the particles comprise a mixture of enzymically active material and a binding agent, a resinous copolymer of maleic anhydride or a partial ester of a resinous copolymer of maleic anhydride. The agglomerated enzyme product can be added to a conventional detergent product with surprisingly little loss of activity. By using a wide variety of suitable inert ingredients agglomerate products can be produced having a density approximating that of the detergent product to which they are to be added, thus, greatly reducing or eliminating the problem of segregation.

The reasons or reason for the greatly increased stabiliity of the enzyme product of the present invention as compared to previously available products are not known with certainty, but the increased stability is believed to be due to the nature of the binding agent. Even though it might be assumed that there would at most be surface inactivation in a dry mixture, it now appears that the instability of conventional enzyme products in detergent compositions is most often due to the alkaline nature of some conventional detergent materials, and in the products of the present invention, the enzyme is protected perhaps by limited contact with the alkaline detergent materials and/or by the action of the binding agent on the enzyme. However, applicant does not wish to be bound by any particular theory or theories.

Generally, the enzyme or enzymes obtained from a fermentation using micro-organisms are in an impure state, a finely divided solid material containing an enzyme or a mixture of enzymes and inert ingredients. The term "enzymically active material" as used in this specification will refer to a material composed of about 1% to about 95% of the active enzyme or a mixture of active enzymes and about 5% to about 99% of inert ingredients such as nutrients used to grow the bacteria, diluents, detergent additives including builders, surfactants, optical brighteners, corrosion inhibitors, bleaches, dyes, bacteriostats and the like. The "active enzyme" or "enzyme activity" is its ability to change or degradate the undesirable soil and the "stability" is its property of remaining active.

The agglomerated enzyme product produced in accordance with this invention contains enzymes or a mixture of enzymes which are protein substances. Enzymes are generally classified in terms of their function which represents different chemical reactions, as in this instance where the chemical reaction results in either the degradation or change of soil. However, as with most classification systems, there are some enzymes whose function will fit into two or more classes. Following is a list of five subclasses of enzymes based on their function.

(I) Hydrolases are enzymes that catalyze the splitting of soil, especially that of a proteinaceous nature by the addition of water.

(II) Oxidoreductases are enzymes that catalyze the oxidation or reduction of soil.

(III) Transferases are enzymes which transfer one radical from one molecule to another and change soil form an insoluble form, for example, to a soluble form that can easily be removed.

(IV) Demolases are enzymes which split or form linkages without transfering groups and degrade soil of the hydrocarbon type, for example, making it easier to remove.

(V) Isomerases are enzymes which isomerize molecules and chemically change soil of the fat type, for example, making it easier to remove.

Generally speaking, hydrolases, oxidoreductases and demolases degrade soil such as that of the proteinaceous nature until it is removed or rendered easier to remove and transferases and isomerases change soil such as that of the fatty type, making it easier to remove. Of these type, hydrolyases are particularly preferred.

Hydrolases catalyze the addition of water to the soil and thus cause a splitting of the soil, for example, hydrolases split body proteins making them easier to remove. The hydrolases which are particularly preferred include proteases, esterases, and nucleases. Proteases catalyze the hydrolysis of peptide linkages, to yield poly peptides and amino acids, thus degrading the protein substances in hard to remove soils such as blood, gravy, skin protein containing perspiration and the like.

Specific examples of proteases suitable for use in this invention include pepsin, rennin, trypsin, bromelain, papain, chymotrypsin, collagenase, keratinase, elastase, carboxypeptidase, aminopeptidase and subtilisn.

Esterases catalyze the hydrolysis of ester links in fats, alcohols esters, phosphoric esters, sulfuric esters, thioesters and phenolic esters. Examples of these esterases include, lipae, cholinesterase, phytase, and phosphatase.

Carbo-hydrases catalyze the spliting of glycosidic linkages, and are particularly effective in decomposing carbohydrates. Specific examples of these enzymes include $\alpha$ and $\beta$ amylase, maltase, sucrase and cellulase. Nucleases catalyze the splitting of nucleic acids and related compounds such as found in skin cells. Two specific examples of this group are ribonuclease and deoxyribonuclease.

The above enzymes can be obtained from micro organisms which include bacteria, yeasts, fungi and the like by using well-known fermentation methods such as those described in Kirk and Othman, Encyclopedia of Chemical Technology, volume 8, page 173–204.

Examples illustrative of the microorganisms include:

BACTERIA

*Bacillus subtilis, Bacillus mesentericus, Bacillus cereus, Serratia marcescens, Clostridium felsinium, Clostridium acetobutylicum, Leuconostac mesenteroides* and *Lactobacillus sake.*

ACTINOMYCETES

*Streptomyces griseus, Streptomyces scabies, Sterptomyces albus, Streptomyces alboflavus* and *Streptomyces abikoensis.*

YEASTS

*Saccharomyces cerevisiae, Torula utilis* and *Candida lipolytica.*

FUNGI

*Rhizopus javanicus, Rhizopus oryzae, Rhizopus japonicus, Rhizopus chinensis, Rhizopus reflexus, Rhizopus delemar, Rhizopus nigricans, Rhizopus nivenus, Rhizopus arrhizus, Rhizopus achlamydosporus, Rhizopus formosaensis, Aspergillus oryzae, Aspergillus sojae, Aspergillus inuii, Aspergillus aureus, Aspergillus saitoi.*

The following micro-organisms produce either a protease, lipase, amylase or mixtures thereof:

PROTEOLYTIC

*Bacillus subtilis, Bacillus cereus, Bacillus mesentericus, Streptomyces scabies, Streptomyces alubus, Aspergillus oryzae, Aspergillus sojae, Aspergillus ochaceus, Aspergillus mellus, Aspergillus saitoi.*

LIPOLYTIC

*Candida lypolytica, Rhizopus delemar, Rhizopus javanicus,* and *Aspergillus aureus.*

AMYLOLYTIC

*Rhizopus javanicus, Aspergillus oryzae, Aspergillis sojae, Bacillus subtilis* and *Bacillus mesentericus.*

The enzymically active material produced from the above bacteria is generally in a finely divided solid or powder form. The active enzyme is usually present in an amount of from about 1% to about 95% of the finely divided solid material preferably from about 3 to about 50% and 5% to 99% by weight of inert ingredients heretofore mentioned, and preferably from about 50% to about 97%. The activity of the enzyme depends on the methods of preparation and is not critical to the present invention providing that the enzymically active material has the desired enzyme activity. Various analytical methods are available to determine the activity of the different enzymes, for example, the protease activity of a proteolytic enzyme is determined by the well-known Casein Method. According to this test a protease catalyzes the hydrolysis of the casein for a certain period of time and temperature; the reaction is stopped by the addition of trichloroacetic acid, and the solution is filtered. The color of the filtrate is developed by a folin reagent, and the level of enzyme activity is measured spectrophotometrically. This method is more fully described in the Journal of General Physiology 30, 291 (1947) and in Methods of Enzymology, Academic Press N.Y. 1955, vol, 2 p. 33.

The finely divided solid enzymically active materials which are produced from the aforementioned bacteria generally will pass through the standard U.S. 20 mesh screen although larger particles are often found. Some finely divided solidenzymically active materials which are produced from the aforementioned bacteria are sufficiently fine to pass the standard U.S. 100 mesh screen. Generally the greater part of the particles will be retained on a U.S. 400 mesh screen. Thus, the finely divided solid enzymically active materials used herein are within the range of from about 1 micron up to 1000 microns and more commonly from about 10 microns to about 100 microns.

An enzyme suitable for use in accordance with this invention is on that has its activity at a pH from about 4 to about 12, preferably from about 7 to about 11 and at a temperature of from about 10° C. to about 85° C., preferably from about 20° C. to about 76° C.

A particularly effective enzymically active material than can be used in the present invention is one produced by a mutated *Bacillus subtilis* organism. The process for producing this organism is described in U.S. Pat. 3,031,380. A culture of the *Bacillus subtilis* organism has been deposited with the United States Department of Agriculture, Agricultural Research Service, Northern Utilization Research and Development Division, 1815 North University Street, Peoria, Ill. 61604, and has been assigned No. NRRL B–3411. An enzymically active material produced from this organism consists of two proteases approximately 65–75% neutral protease (activity at a pH of 7.0–7.5) and about 25–35% alkaline protease (activity at a pH of 10 to 1). A significally amount of amylase is present. There are generally about 700 thousand to about 1.2 million units of neutral protease activity per gram and about 250 thousand to about 400 thousand units of alkaline protease activity per gram as determined by the "Casein" method. There are generally about 300 thousand to 350 thousand units of amylase activity per gram. Its particle size is predominantly in the range from about 5 microns to about 35 microns. This enzymically active material used in accordance with the invention gives excellent results in washing solutions at a temperature in the range from approximately 10° C. to approximately 65° C. and at a pH from about 7 to about 11.

Another enzymically active material that can be used in the present invention is one produced from *Streptomyces griseus* cultural broth used for the manufacture of streptomycin. It is isolated by the treatment of successive columns of resin. The principal component is a neutral protease called *Streptomyces griseus* protease. This enzyme, stabilized with a calcium salt, is active at a pH of from about 4 to about 10 and is stable at a temperature from about 10° C. to about 65° C.

Other effective enzymically active materials are produced by *Streptomyase Rectus* and Prolisin.

The particular enzymically active material chosen for use in the agglomerated enzyme products are processes in accordance with this invention depends on the final conditions of use including the pH, desired solubility of the product, temperatures, and type of soil which is going to be degraded or changed. The enzymically active material may be chosen to give optimum activity and/or stability for any given set of conditions of use.

Generally, the activity of the enzymically active material per gram after purification is appreciable and must be diluted before inclusion in end products such as, detergents or presoaks. The amount of enzymically active material in the end products will depend on the amount of activity desired in these end products. The activity of the enzymically active material can be diluted to any desired level with the following ingredients: sodium sulfate, soda ash, starch, asbestos, calcium sulfate, diatomaceous earth, silica, powdered talc, kaolinate clay and the like, and then agglomerating by the novel process of this invention.

When the agglomerated enzyme products are admixed with a formulated detergent, generally, it is desirable to select a diluent that has about the same bulk density, as that of the detergent formulation. The above mentioned materials have a wide density range from about 0.1 to about 1.3 grams per cc. and are used to give the enzymically active materials a bulk density of from about 0.1 to about 1.4, grams per cc., the general bulk densities of current commercial detergents. For example, soda ash, bulk density 0.35 grams per cc. is used to dilute the enzyme activity, and after agglomeration, the enzyme product is incorporated into a bulk density detergent about 0.3 to about 0.45 gram per cc. As a further example, soda ash and/or silica are used to dilute the enzyme activity and after agglomeration are mixed with a light bulk density detergent having a bulk density from about 0.3 to about 0.5 gram per cc. From these examples, it will readily be seen that any desired activity and/or bulk density of the enzymically active material can be formulated, and then agglomerated by the novel process of this invention.

When the calcium salts, such as calcium sulfate, are used as a diluent, they have an additional property of stabilizing the enzymes.

Detergent ingredients also can be used to dilute the activity of the enzymes and include: the trialkali metal phosphates such as trisodium phosphate; tripotassium phosphate; dialkali metal hydrogen phosphates such as disodium hydrogen phosphate and dipotassium hydrogen phosphate; the alkali metal pyrophosphates, for example, tetra sodium pyrophosphate, tetra sodium hydrogen pyrophosphate, tetra potassium pyrophosphate; the alkali metal tripolyphosphate; and the alkali metal metaphosphates such as sodium hexometaphosphate. The following also may be used: the amino polycarboxylic acids and salts such as the sodium potassium and ammonium salts of nitrilotriacetic acid, the sodium potassium and ammonium salts of amino tri(methylene phosphonic acid) as well as the free acid and the diphosphonic acids and salts, methylene diphosphonic acid and 1-hydroxy-1,1-ethylidene diphosphonic acid. The above materials are generally considered builders, i.e., materials that enhance the detergency of the surfactant.

One or a combination of the above mentioned builders are used to dilute the enzyme activity, then agglomerated to give bulk densities that about match that of the commonly used detergents, for example 90% granular sodium tripolyphosphate and 10% enzymically active material are agglomerated by the novel process of this invention and 5% of this agglomerated enzyme product is then admixed with a light bulk density detergent formulation, having a bulk density of about 0.3 to about 0.5 grams/cc.

When it is not desirable to decrease the amount of builder in a detergent formulation, or when one of the above mentioned builders will not give the proper bulk density, the enzyme activity can be diluted with one of the aforementioned inert ingredients, and then agglomerated.

A pre-soak product can be prepared by agglomerating and enzymically active material builder mixture. Illustrative of the builders are the alkali metal tripolyphosphates such as sodium tripolyphosphate. However, it is more advantageous to add some surfactant, to the above mentioned mixture such as a nonionic including the alcohol ethoxylates or an anionic including linear alkylbenzene sulfonate. A typical presoak agglomerated enzyme product contains 88% by weight of sodium tripolyphosphate, 10% by weight of $C_{12}$ through $C_{15}$ primary alcohol condensed with about 8 moles of ethylene oxide and 2% of an enzymically active material.

Additional detergent ingredients that can be agglomerated by the novel process of the present invention include surfactants such as those produced from the saponification of a fatty acid such as palmitic oleic and the like, and the synthetic organic surfactants including the anionic, nonionic and amphoteric organic surfactants including the anionic, nonionic and amphoteric types and mixtures thereof.

Anionic synthetic surface active agents are generally described as those compounds which contain hydrophilic and lyophilic groups in their molecular structure and ionize in an aqueous medium to give anions containing both the lyophilic groups and hydrophilic groups. The alkyl aryl sulfonates, such as sodium dodecylbenzene sulfonate; the alkane sulfates, such as sodium dodecyl sulfate; and the sulfated oxyethylated phenols, such as sodium tetradecyl phenoxy triethyleneoxy sulfate, are illustrative of the well-known class of anionic type of surface active compounds.

Nonionic surface active compounds can be broadly described as compounds which do not ionize but acquire hydrophilic characteristics from an oxygenated side chain such as polyoxyethylene and the lyophilic part of the molecule may come from fatty acids, phenols, alcohols, amides, or amines. The compounds are usually made by reacting an alkylene oxide such as ethylene oxide, butylene oxide, propylene oxide, and the like with fatty acids, the straight or branched chain alcohols, phenols, thiophenols, amides, and amines to form polyoxyalkylene glycol ethers and esters, polyoxyalkylene alkyl phenol and polyoxyalkylene thiophenols, and polyoxyalkene amides and the like. It is generally preferred to react from about 1 to about 30 moles of alkylene oxide per mole of the fatty acids, alcohols, phenols, thiophenols, amides, or amines. Illustrative of the surface active agents include the product obtained from condensing ethylene oxide with the following: propylene glycol, ethylene diamine diethylene glycol, dodecyl phenol, nonyl phenol, and the like.

Amphoteric surface active compounds can be broadly described as compounds which have both an anionic and cationic group in their structure. Illustrative of the amphoteric surface active agents are the amido alkane sulfonates, such as sodium C-tridecyl, N-methyl, amido ethyl sulfonate.

Other individual compounds which are illustrative of the aforegoing classes of surface active agents are well-known in the art and can be found in standard detergent reference materials such as Surface Active Agents, Swartz and Perry, Interscience Publishers, Inc., New York, N.Y. (1949).

The above surfactants can be agglomerated with enzymically active materials, however, in most instances this is not. Generally, the above surfactants are combined with the aforementioned builders and enzymically active materials to produce an agglomerated pre-soak product.

Additional detergent ingredients that can be agglomerated with the enzymically active material and which are highly advantageous are bacteriostats such as 3,4,4: trichlorocarbanilide and the like. A perborate bleach can also be agglomerated with the enzymically active material. Either of the above two mentioned ingredients can be agglomerated with the enzymically active material and then admixed with a detergent or they can be agglomerated with a detergent that includes perborate bleaches or bacteriostats.

Other addition detergent ingredients that are usually found in detergent formulations can be agglomerated with the enzymically active materials, and include anti-redeposition agents, brightening agents, corrosion inhibitors, perfumes, inert fillers, blueing agents, and the like.

It will be radily be appreciated that both the stability and activitiy of the enzymes is maintained with little or no loss of activity, when the enzymically active materials are agglomerated with any of the aforementioned ingredients which, because of their alkylinity or acidity, are generally considered to inactivate enzymes. Due to the fact that a wide variety of ingredients can be agglomerated with the enzymes, various products having different densities and formulations can be prepared.

The novel process for preparing agglomerated enzyme product comprises mixing with a finely divided solid enzymically active material active at a pH of from about 4 to about 9, an organic solvent which contains a binding agent, a copolymer of olefin-maleic anhydride, and then removing the solvent, forming an agglomerated enzyme product.

In accordance with this invention, the binding agents that can be utilized include the linear and cross-linked resinous copolymers of maleic anhydride and a partial ester of a copolymer of maleic anhydride, such a copolymer comprises repeating structural units in which maleic anhydride and a different monomer are present in a chain; for example, as represented in the following general formula:

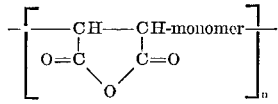

Generally, the "-monomer-" is an alkylene group containing about 2 through 20 carbon atoms and, preferably, between about 2 and 8 carbons. The alkylene monomer can be substituted or unsubstituted. When substituted, the substituents can be, for example, aryl; alkaryl; carbamyl; carbalkoxy (generally containing up to about 5 carbon atoms); lower alkoxy and acyloxy; aryloxy, containing 6 to 14 carbon atoms; and heterocyclic moieties, containing between about 3 and 7 ring atoms and wherein the hetero atoms can be nitrogen, sulfur, or oxygen. Exemplary of the copolymers of maleic anhydride utilized in this invention are ethylene-maleic anhydride, diisobutylene-maleic anhydride, alkyl acetate-maleic anhydride, propylene-maleic anhydride, butylene-maleic anhydride, vinylpyrrolidone-maleic anhydride, acrylamide-maleic anhydride, methyl acrylate-maleic anhydride. Although both the linear and cross-linked olefin-maleic anhydride copolymers are useful in preparing the compositions of this invention, the cross-linked copolymers are preferred. One of the preferred cross-linking agents is vinyl crotonate, in an amount from about 0.1% to about 5% by weight; but other known difunctional vinyl type cross-linking agents are used during the polymerization of the olefin and maleic anhydride. Difunctional compounds, such as glycols and diamines, can also be used as cross-linking agents. However, these types are normally utilized after polymerization has taken place. The copolymers may be manufactured by any of the usual vinyl polymerization processes, which are well-known in the art.

These copolymers of maleic anhydride can simply and economically be converted to a partial ester, 1 to about 80% esterified with an alkanol containing 1 to 16 carbon atoms. In most cases the ester moiety contains between about 2 and 7 carbon atoms. It is preferred that the ester moiety contains 3 to 4 carbon atoms, since superlative binding properties are exhibited by such esters.

Generally, these partial esters include (1) a partial ester vinyl alkyl ether-maleic anhydride copolymer wherein said alkyl group contains between about 1 and 3 carbon atoms and said ester moieties contain between about 2 and 7 carbon atoms; (2) a partial ester of alkylene-maleic anhydride copolymer wherein said alkylene group contains between about 2 and 4 carbon atoms and said ester moieties contain between about 2 and 7 carbon atoms; or (3) a partial ester of a substituted ethylene-maleic anhydride copolymer wherein the substituent groups are cyclic, such as pyrrolidone or benzene, and said ester moieties contain between about 2 and 7 carbon atoms.

A preferred embodiment of this invention is a binding agent comprising a copolymer of a partial ester of (1) an ethylene-maleic anhydride copolymer or (2) a vinyl methyl ether-maleic anhydride copolymer wherein the ester moieties of said copolymers contain between about 2-7 carbon atoms.

Exemplary of these preferred copolymers are the partial propyl ester of ethylene-maleic anhydride; the partial butyl ester of ethylene-maleic anhydride, the partial propyl ester of vinyl methyl ether-maleic anhydride; the partial isopropyl ester of vinyl methyl ether-maleic anhydride; and the partial butyl ester of vinyl methyl ether maleic anhydride.

The viscosity of a 5.0% solution of the above mentioned copolymers are measured at 25° C. using a Brookfield viscometer, No. 1 spindle at 30 revolutions per minute.

The above mentioned copolymers can exist in an acid, anhydride or salt form. It is to be understood that the term "maleic-anhydride" when used herein referring to the said copolymers and partial esters of the said copolymers includes the anhydride, acid and salt forms. Generally, any alkaline agent such as inorganic, organic, and nitrogen-containing compounds and the like can be employed to convert the anhydride, or acid to its corresponding salt. The inorganic agents include ammonium hydroxide, sodium hydroxide, potassium hydroxide and other metal hydroxides. The organic agents include alkyl amines, alkanolamine, diamines, and triamines, with those containing from 1 to 7 carbon atoms in the hydrocarbon groups performing well in the practice of the invention, whether they be primary, secondary, or tertiary compounds. The alkyl amines include mono-, di- and trimethyl and ethyl amines and the like. The alkanolamines include the mono-, di-, tri-methanol-amines and ethanolamines and the like. Among the preferred agents are 2 - amino - 2 - methyl - 1 - propanol, di - isopropanolamine triethanolamine, and diethylamine.

Especially preferred salts of the above copolymers include the alkyl amine salts, having 1 to 7 carbons in the alkyl group, of a partial ester of ethylene-maleic anhydride copolymer or a vinyl methyl ether-maleic anhydride copolymer wherein the ester moieties of said copolymers contain between about 2–7 carbon atoms.

Illustrative examples include the diethylamine salt of ethylene-maleic anhydride, about 40 to 60% esterified with normal butyl alcohol, the methyl amine salt of vinyl methyl ether-maleic anhydride, 40 to 60% esterified with propyl alcohol, and the triethyl amine salt of vinyl methyl ether-maleic anhydride, 40 to 60% esterified with normal butyl alcohol.

It is preferred that a 1% solution of the salts of the copolymers in water at 25° C. have a pH of from about 7 to about 10 and especially preferred that the salts be essentially neutral, that is have a pH of from about 6.5 to about 7.5.

Generally the binding agents are soluble or dispersible in the organic solvents which will hereafter be more fully described. By soluble it is meant that 0.1 gram of material will dissolve in 100 grams of organic solvent at 20° C.; by dispersible it is meant that at least 0.5 gram can be suspended in 100 grams of organic solvent at 20° C.

The amount of binding agent required in accordance with this invention varies from about 0.1% by weight to about 25% by weight based on the weight of the enzymatically active material.

Generally, it is preferred that the viscosity of the binder solvent mixture be from about 1 centipoise to about 1500 centipoises. Higher viscosities, i.e., above 1500 centipoises result in a mixture in the form of a gel. This gel can be used in the novel agglomeration process, however, in most instances, it is difficult to work within that an intimate mixture of the binder solvent and the enzymatically active material is hard to achieve. Therefore, from about 5% to about 25% based on the weight of the enzymatically active material of an essentially neutral alkyl amine salt, said salt having 1 to 7 carbon atoms in the alkyl group, of ethylene maleic anhydride about 40% to about 60% esterified with an alcohol having 1 to 5 carbons for example, the essentially neutral diethylene amine salt of ethylene maleic anhydride about 40 to about 60% esterified with normal butyl alcohol, can be used as a binding agent and the viscosity of the binder-solvent mixture, said solvent being an alcohol having 1 to 5 carbon atoms, methyl alcohol, for example, will be lower than 1500 centipoises. When as essentially neutral alkyl amine salt said salt having 1 to 7 carbon atoms in the alkyl group of ethylene maleic anhydride cross-linked with vinyl crotonate is used as a binding agent, in an amount from about 0.1% to about 2% based on the weight of the enzymatically active material the viscosity of the solvent-binder mixture, said solvent being an alcohol having 1 to 5 carbon atoms, is less than 1500 centipoises. If the essentially neutral ammonium salt of ethylene maleic anhydride cross-linked with vinyl crotonate is used as a binding agent, about 13% to about 15% based on the weight of the enzymatically active material can be used and the viscosity of the solvent binder mixture is less than 1500 centipoises.

The agglomerated enzyme products produced by the above examples are water soluble, i.e., soluble in water to the extent of 0.01% at 25° C. A water insoluble agglomerated enzyme product can be produced in accordance with this invention by using as a binding agent, the copolymer of ethylene maleic anhydride about 40 to about 60% esterified with an alkanol having 1 to 6 carbon atoms, for example, the copolymer of ethylene maleic anhydride about 40 to about 60% esterified with normal butyl alcohol. The copolymer can be used in an amount from about 5% to about 25% based on the weight of the enzymatically active material and the viscosity of the binder-solvent mixture, said solvent being an alcohol having 1 to 5 carbon atoms, will be lower than 1500 centipoises. An advantage of the insoluble agglomerated enzyme product is that it can be stored for a long period of time prior to use and during this time the enzyme is protected from moisture. At the time of use, an insoluble agglomerated enzyme product is made water soluble by converting the binding agent to its salt by the addition of a solvent containing a base and then agglomerating this mixture again. Another way of rendering the insoluble agglomerated enzyme product water soluble is to use the product in a strongly alkaline solution having a pH of from about 8 to about 12.

The organic solvents that can be used in accordance with this invention include various saturated or unsaturated aliphatic and aromatic compounds, such as the monohydric or polyhydric aliphatic or cyclic alcohols, aliphatic and cyclic ethers, ketones, aliphatic esters, mixtures thereof and the like.

The solvents that are used in accordance with this invention have a melting point below about 60° C. and a vapor pressure of at least 1 millimeter of mercury at temperatures of about 60° C. When heat is added to remove the above solvents the temperature generally is kept below about 60° C. as higher temperatures generally result in some loss of activity of the enzyme. Illustrative organic solvents are the alkyl and alkanol alcohols having 1 to 5 carbons in the alkyl group such as, methyl, ethyl, isopropyl, isobutyl, n-amyl, and allyl; polyhydric alcohols such as ethylene glycol, 1,3-butanediol; alkyl substituted phenyl alcohols having 1 to 5 carbons in the alkyl group such as benzyl, and methyl phenyl carbitol; cyclic alcohols having 1 to 15 carbon atoms including cyclohexanol. Illustrative of the ether solvents are dialkyl ethers having 1 to 10 carbon atoms including ethyl ether, ethyl n-butyl ether and cyclic ethers and poly ethers having 1 to 10 carbon atoms including tetrahydrofuran, and 1,4-dioxane. Examples of ketones include dialkyl ketones having 1 to 10 carbons including acetone, methyl ethyl, diethyl; cyclic ketones having 1 to 6 carbon atoms such as cyclohexanone and alkyl phenyl ketones having 1 to 6 carbon atoms in the alkyl group such as acetophenone.

Illustrative ester solvents are alkyl esters having 1 to 5 carbon atoms including methyl acetate, ethyl formate and cyclic esters having 1 to 8 carbons including ethylene carbonate. Examples of hydrocarbons include hydrocarbons having 1 to 15 carbons such as benzene, toluene, ethyl-benzene; alkyl chlorides, having 1 to 5 carbons including propylene chloride, chloroform, and polychlorinated benzenes including trichlorobenzene. Additional solvents include acetonitrile, pyridine, and formamide.

Depending on the vapor pressures of the above solvents when used in the novel agglomeration process they can be removed by either allowing them to evaporate in open containers at a temperature from about 10° C. to about 22° C., or by the addition of heat to drive off the solvent. When heat is added the temperature is generally kept below about 60° C. as higher temperatures generally result in some loss of activity. By reducing the pressure and using vacuum, those solvents having a vapor pressure lower than one atmosphere can be removed at temperatures lower than 60° C.

Particularly preferred solvents are alcohols having 1 to 5 carbon atoms and more preferably ethanol, and methanol. It is necessary that the organic solvent be substantially anhydrous containing at the most about 10% water, preferably not more than about 5% water, and more preferably not more than about 2% water.

The amount of solvent used in accordance with this invention will vary depending on the solvent-binder to enzymically active material ratio. Generally this ratio will vary from about 0.1:1 to about 5:1 and preferably 0.1:1 to about 0.9:1. By adjusting this ratio, agglomerated enzyme products can be produced that have various bulk densities which then can be admixed with commercially available detergents of different bulk densities. When the enzyme is agglomerated with one of the hereinbefore mentioned inert ingredients the binder-solvent to agglomerated enzymically active material ratio is the same as mentioned above. The bulk density of the inert ingredient will influence the bulk density of the agglomerated enzymically active material and the binder-solvent to enzymically active material ratio must be adjusted accordingly, for example, the enzymically active material containing about 5% active enzyme and about 95% inert ingredients having a density of about .23 grams per cc. is agglomerated by the novel process of this invention keeping the solvent-binder to enzymically active material ratio between about .7:1 to about .8:1 resulting in an agglomerated enzyme product having a bulk density of about .35 grams per cc. This material can then be admixed with a light density detergent. 10% active enzyme and 90% sodium tripolyphosphate powder having a bulk density of about 0.8 grams per cc is also agglomerated keeping the ratio of solvent-binder to enzymically active material from about .3:1 to about .4:1 resulting in a product that has a bulk density of about .52 grams per cc. This product can then be admixed with a medium density detergent. 10% active enzyme and 90% soda ash is agglomerated keeping the solvent-binder to enzymically active material ratio from about .5:1 to about .6:1 resulting in a product having a bulk density of about .40 grams per cc. This product can then be admixed with a light bulk density detergent.

The particle size of the agglomerated enzymically active material is also controlled by the solvent binder to enzymically active material ratio. Generally, the particle size of the agglomerated enzyme product produced by the novel process of this invention ranges between about —10 (U.S. screen) and about +200 (U.S. screen) meaning that about 99% is retained on a No. 200 mesh screen. A preferred range is about —14 +100, (U.S. screen) the particle size of commercially available detergent. The above mentioned examples had a particle size of about —14 +80.

In order to color the enzymically active material, dyes and pigments that are soluble or dispersable in water, that is the material is either water soluble to the extent that at least 0.1 grams of material will either dissolve in 100 grams of water at 20° C. or that a dispersion or suspension of at least 0.5 grams of the coloring material can be made in 100 cc. of water at 20° C., are used. Illustrative examples of coloring materials include, Rhondamin B, Maxilon Pink, Auramine, Crystal Violet, Safranine, Methylene Blue, Polar Blue, Ultramarine Blue, Sky Blue, Polar Yellow, Acridine Orange, and Aurora Pink. Colored enzymically active materials are admixed with detergent formulations to give a speckled appearance.

Fluorescent colors are also used to enhance the color of the dyes and pigments, such as Sodium Fluorescein.

Colored enzymically active material can also be prepared by using the method described in copending U.S. application, Ser. No. 671,225, filed Sept. 28, 1967 and assigned to the same assignee as the instant application.

This method involves the mixing of a solid water soluble or water dispersible coloring material with a hydratable salt, hydrating the salt and then agglomerating the colored hydratable salt with the enzymically active material to produce a colored agglomerated enzyme product.

Another problem sometimes associated with enzymically active materials is an offensive odor. This odor can be improved or masked by the addition of perfumes or masking agents.

It will readily be appreciated that there is a wide selection of solvents and binding agents that can be used in accordance with this invention.

In carrying out the novel process in accordance with this invention a binder solvent mixture is formed. Any order of mixing can be used, that is the binding agent can be dissolved or dispersed in the solvent or the solvent can be added to the binding agent. It is preferred that the binding agents be dissolved or dispersed in the solvent.

In accordance with the process there can be either a fast or a slow rate of addition of the binder solvent mixture to the enzymically active materials. If added all in one portion, the enzymically active material is then mixed in a suitable container to bring about agglomeration. It is preferred to spray the binder solvent mixture onto the enzymically active material gradually while said material is rotating in a blender. This is advantageous in that in gradual addition of the binder solvent mixture prevents the enzymically active material from becoming too wet.

The solvent can be removed by evaporation from an open container at a temperature of from about 10° C. to about 22° C. As mentioned hereinbefore, heat can be used as long as the temperature is generally kept under 60° C. to remove the solvent and form the agglomerated enzyme product. By reducing the pressure and using vacuum, those solvents having a vapor pressure below one atmosphere can be removed at temperatures lower than 60° C.

To specifically illustrate the invention, the following examples are presented. All parts, proportions and percentages are by weight unless otherwise indicated.

EXAMPLE I

Into a rotary blender are charged 952 parts of a finely divided enzymically active material produced by a *Bacillus subtilis* mutant, NRRL No. B-3411, having a protease activity at pH 7 of 1,126,000 units per gram as determined by the Casein method. A mixture is prepared of 628 parts of methyl alcohol and 42 parts of the essentially neutral diethyl amine salt of a copolymer of ethylene maleic anhydride, 40 to 60% esterified with normal butyl alcohol dissolved in 30 parts of methyl alcohol. The solution of the salt is prepared by dissolving 30 parts of the copolymer of ethylene maleic anhydride, 40 to 60% esterified with normal butyl alcohol, viscosity of a 5% solution in methanol at 25° C. is 20 centipoises as determined by a Brookfield L.V.F. viscometer, spindle No. 1 at 30 r.p.m., and 12 parts of diethylamine in 30 parts of methanol. The viscosity of the solvent-binder mixture is about 7 centipoises determined in the same manner as above and the solvent-binder to enzymically active material ratio is about .7:1. The solvent-binder blend is charged to the enzymically active material which is tumbling in a rotary dryer through spray nozzles. The objective is to feed the liquids to the dry raw materials as rapidly as possible, to wet and then agglomerate the solids. The agglomerated material is charged to a drum dryer where the temperature is kept below about 50° C. and the methyl alcohol is removed. About 80% of the agglomerated enzyme product has a particle size smaller than the openings in a U.S. Standard 14 mesh screen and larger than the openings in a U.S. Standard 80 mesh screen and has an apparent bulk density of about 0.4 grams/cc.

The above material stored in open containers is tested to determine if there is any activity loss over a 4 week period. The conditions of the test are temperature 27° C., and relative humidity 40%. The results of this test are given in Table I below.

EXAMPLE II

Into a rotary blender are charged and mixed 890 parts of sodium tripolyphosphate, bulk density about 0.51 to about 0.61 gram per cc. and 100 parts of enzymically active material produced by a *Bacillus subtilis* mutant, NRRL No. B-3411 having 1,122,000 protease units of activity per gram at pH 7 as determined by the Casein Method. A mixture is prepared of 400 parts of methyl alcohol and 28 parts of the essentially neutral diethyl amine salt of a copolymer of ethylene maleic anhydride, 40 to about 60% esterified with normal butyl alcohol, dissolved in 20 parts of methyl alcohol. The solution of the salt is prepared by dissolving in 20 parts of methanol, 20 parts of the copolymer of ethylene maleic anhydride, 40 to 60% esterified with normal butyl alcohol, the viscosity of a 5% solution in methyl alcohol being about 20 centipoises as determined in the same manner as in Example I, and 8 parts of diethylamine. The viscosity of the solvent-binder solution is about 7 centipoises determined by a Brookfield L.V.F. viscometer, spindle No. 1 at 30 r.p.m. The ratio of the solvent-binder mixture to the enzymically active material is about 0.46:1. The solvent-binder solution is sprayed onto the enzymically active material sodium tripolyphosphate mixture which is tumbling in the rotary blender. This mixture is agglomerated in the same manner as set forth in Example I. About 80% of the enzyme product had a particle size smaller than the openings in a U.S. Standard 14 mesh screen and larger than the openings in a U.S. Standard 80 mesh screen and has an apparent bulk density of about .5 to about .6 gram per cc. The above product is tested for the loss of activity in the same manner as set forth in Example I. The results of these tests are given in Table I below.

TABLE I

| Product | Activity units per gram | | |
| --- | --- | --- | --- |
| | Original | After 1 week | After 4 weeks |
| Agglomerated enzyme product neutral protease enzyme | 1,126,000 | 1,121,000 | 1,121,000 |
| Agglomerated enzyme product 10% neutral protease enzyme and 90% sodium tripolyphosphate | 112,200 | 112,100 | 111,800 |

As can be seen from the above table, there is no significant activity loss over the four week period by either the agglomerated enzymically active material or by the agglomerated enzymically active material sodium tripolyphosphate mixture. A loss of 4,000 units out of a million units is not considered significant.

EXAMPLE III

Into a rotary blender are charged are mixed 100 parts of enzymically active material having the same protease activity as that of Example II and 897 parts of soda ash. A mixture is prepared of 400 parts of methyl alcohol and 28 parts of the esentially neutral diethylene amine salt of a copolymer of ethylene anhydride, about 40 to about 60% esterified with normal butyl alcohol, dissolved in 20 parts of methyl alcohol. The solution of the salt is prepared in the same manner as in Example II. The viscosity of the solvent-binder solution is about 7 centipoises determined in the same manner as set forth in Example I. The ratio of the solvent-binder mixture to enzymically active material is about .46:1. The copolymer solvent blend is charged to the soda cash enzymically active material tumbling in a rotary blender through spray nozzles. It is agglomerated in the same manner as set forth in Example II. About 80% of the agglomerated enzyme product has a particle size smaller than the openings in a U.S. Standard 14 mesh screen and larger than the openings in a U.S. Standard 80 mesh screen and has an apparent bulk density of about 0.3 gram per cc.

EXAMPLE IV

Into a rotary blender are charged 897 parts of sodium tripolyphosphate having a bulk density of about 0.5 to about 0.61 gram per cc. and 100 parts of enzymically active material containing the same enzyme and having the same protease activity as in Example II. A mixture is prepared of 400 parts of ethyl alcohol and 28 parts of the essentially neutral diethylamine salt of a copolymer of ethylene maleic anhydride, about 40 to about 60% esterified with normal butyl alcohol dissolved in 20 parts of ethyl alcohol. The solution of the salt is prepared by dissolving 20 parts of the copolymer of ethylene maleic anhydride, about 40 to about 60% esterified with normal butyl alcohol, the viscosity of 5% solution in ethanol at 25° C. being about 10 centipoises as determined by a Brookfield L.V.F. viscometer, spindle No. 1 at 30 r.p.m., and 8 parts of diethyl amine dissolved in 20 parts of ethyl alcohol. The viscosity of the solvent-binder solution is about 10 centipoise as determined by the same method as above. The ratio of the solvent binder to enzymically active material is about .46:1. The solvent-binder mixture is added to the sodium tripolyphosphate enzymically active material blend through spray nozzles and agglomerated in the same manner as set forth in Example III. About 80% of the enzyme product has a particle size smaller than the openings in a U.S. Standard 80 mesh screen and apparent bulk density of about 0.5 to about 0.6 gram per cc.

EXAMPLE V

Example IV is repeated using as solvents isopropyl alcohol, isobutyl alcohol and normal propyl alcohol.

EXAMPLE VI

Example IV is repeated using as a binding agent the following copolymers: the essentially neutral triethyl amine salt of the copolymer of methyl vinyl ether maleic anhydride, 40 to 60% esterified with normal butyl alcohol, and the essentially neutral diethylamine salt of the copolymer of ethylene maleic anhydride, about 40 to about 60% esterified with isopropoyl alcohol, the agglomerated enzyme products produced using the above binding agents had the same excellent properties as the agglomerated enzyme product in Example IV.

EXAMPLE VII

Into a rotary blender are charged 897 parts of sodium tripolyphosphate having a bulk density of about 0.75 to about 0.90 gram per cc. and 100 parts of enzymically active material containing the same enzyme and having the same protease activity as that of Example II. A mixture is prepared of 200 parts of methyl alcohol and the essentially neutral diethylamine salt of ethylene maleic anhydride cross-linked with vinyl crotonate. The salt solution is prepared by dispersing 20 parts of ethylene maleic anhydride cross-linked with vinyl crotonate so that the viscosity of a 2% solution at 25° C. is 1200 centipoises as determined by a Brookfield L.V.F. viscometer, having a No. 1 spindle at 30 r.p.m., and 20 parts of diethylamine dissolved in methyl alcohol. The viscosity of the solvent-binder solution is about 600 centipoises as determined by the same manner as in Example II. The ratio of the solvent-binder mixture to enzymically active material is about 0.5:1. The solvent binder solution is added to the sodium tripolyphosphate enzymically active material blend through spray nozzles and agglomerated in the same manner as set forth in Example II. About 80% of the agglomerated enzyme product has a particle size smaller than the openings in a U.S. Standard 20 mesh screen and larger than the openings in a U.S. Standard 100 mesh screen and has an apparent bulk density of about 0.75 gram per cc.

In accordance with this invention a detergent formulation comprising an agglomerated enzyme product, an organic detergent active and a bulider can be prepared. As noted hereinbefore that by using an ordinary detergent, that is one that is commercially available, it is very difficult to remove soil of a protein, hydrocarbon or a fat nature such as blood, eggs, gravy, and the like. However, by using a detergent formulation containing one of the enzymes hereinbefore mentioned these soils can readily be removed. The agglomerated enzyme product contains from about 1% to about 95% of the active enzyme and from about 5% to about 99% of the inert ingredient. Preferably the range of the active enzyme is from about 3% to about 50%. The amount of active enzyme that must be incorporated into a detergent to remove the above mentioned soil generally is in the range from about 0.001% to about 2% by weight and generally from about 0.005% to about 0.5% by weight of the detergent composition. Therefore, about 5% of an agglomerated enzyme product containing about 20% enzymically active material and 90% inert ingredients such as sodium sulfate, for example, could be incorporated into a detergent formulation.

If the agglomerated enzyme product contained 20% active enzyme and 80% sodium tripolyphosphate, for example, a 100 parts of detergent would require 2.5 parts of agglomerated enzyme product.

Any of the organic actives as described hereinbefore can be used in the detergent formulations. A particularly good class of organic surfactants, the nonionics, are condensation products of a hydrophobic compound having at least 1 active hydrogen atom and a lower alkaline oxide, for example, the condensation product of an aliphatic alcohol containing from about 8 to about 18 carbon atoms and from about 1 to about 30 moles of ethylene oxide per mole of alcohol, or the condensation product of an alkyl phenol containing from about 8 to about 18 carbon atoms in the alkyl group and from about 1 to about 30 moles of ethylene oxide per mole of alkyl phenol. Other advantageous nonionic detergents include condensation products of ethylene oxide with a hydrophobic compound formed by condensing propylene oxide with propylene glycol. Any of the aforementioned builders can be used in the detergent formulations. Particularly good builders are, for example, sodium tripolyphosphate, potassium tripolyphosphate, trisodium nitrilotriacetate, and 1-hydroxy-1-ethylidene diphosphonic acid.

The detergent formulations which incorporate the novel agglomerated enzymically active material of the present invention may contain any of the usual ingredients, diluents and additives, for example, perfumes, antitarnishing agents, anti-redeposition agents, bacteriostatic agents, dyes, fluorescent agents, suds builders, suds depressors, foam stabilizers and the like.

In preparing detergent formulations containing an agglomerated enzyme product the enzymically active material can be agglomerated and then admixed in the desired amount into the detergent formulation. Another method used in the production of a spray dried detergent is to divert a portion of the material that has already been spray dried and agglomerate this material with the desired amount of enzyme and then reblend the agglomerated enzyme and spray dried detergent with the main stream of the finished spray dried detergent particles.

In order to illustrate the invention, the following detergent composition is prepared by admixing the agglomerated enzyme product with a detergent.

EXAMPLE VIII

| | |
|---|---|
| Agglomerated enzyme product [1] | 3 |
| Sodium alkyl benzene sulfonate | 15 |
| Sodium tripolyphosphate | 41 |
| Sodium silicate | 6 |
| Sodium sulfate | 26.5 |
| Sodium carboxymethocellulose | 0.5 |
| Water | 8 |

[1] 90% sodium tripolyphosphate granules, 10% protease, 100,000 μ/gm. neutral protease, 280,000 μ/gm. alkaline.

Under carefully controlled conditions, the above formulation and the same formulation without an agglomerated enzyme product are tested for their ability to remove blood stains. Blood stain swatches are prepared by immersing each of 48 4.5″ x 3″ cotton swatches individually in a solution of 75 milliliters of water and 75 milliliters of blood. After immersion, each swatch was allowed to drain on paper towels and aged overnight at 74° F. at 50% relative humidity.

The blood is "set" by immersing and gently stirring the swatches for two minutes in three liters of distilled water at 49° C. Most of the easy to remove blood will be washed away here, but the swatches are given two additional 30 second rinses, as above to insure maximum blood removal. The swatches are then pressed for 45 seconds on a G-E flat bed dryer, and then refrigerated until they are to be used.

Four swatches are washed in a Terg-O-Tometer bucket for ten minutes in water having a temperature of 49° C., and a 150 parts per million hardness, and a detergent concentration 0.15%. After washing, the four swatches are rinsed for two ten minute periods in 500 milliliters of water. The swatches are then dried by pressing on the G-E flat bed press for 45 seconds, and then read on a Gardner Color Difference Meter. A delta (Δ) appearance number (A.N.) is calculated for each sample. The soil removing ability is indicated by the magnitude of the Δ appearance number. The results of this test are given in Table II.

Exactly the same test is carried out to determine the ability of Example I, and the ability of the same formulation without an agglomerated enzyme product is to remove cocoa milk and sugar soils. The procedure is the same as above with the exception that the cloth is a standard cocoa milk sugar-stained cloth. The washing test conditions are water hardness 150 parts per million, temperature 49° C. and 0.15% detergent. These results are shown in Table IIa.

TABLE II

| Formulation: | Δ Appearance number |
|---|---|
| Detergent formulation—No. agglomerated enzyme product | 9.6 |
| Example VIIII | 16.6 |
| (a) Detergent formulation—No. agglomerated enzyme product | 9.7 |
| Example VIII | 16.6 |

As can be seen from the above table, the soil removing ability of the detergent containing the agglomerated enzyme product is significantly better than the detergent which does not contain any enzymically active material.

Under carefully controlled conditions, the detergent formulation of Example I, with the exception that 5% of the agglomerated enzyme product is present is evaluated to determine its ability to remove natural sebum. The same formulation containing no agglomerated enzyme product is tested in the same manner. Six four inch by four inch swatches are soiled by having a person wipe each swatch over his forehead, cheek and neck two times. The swatches are removed and placed individually on a table and allowed to age overnight. Swatches are read on a Gardner Color Difference Meter before washing. The swatches are washed in a Terg-O-Tometer at 90 r.p.m. under the following conditions. Detergent concentration 0.05%, hardness 150 parts per million, temperature 120° F. and enzyme concentration 0.5%. Appearance numbers are calculated. The results of this test are given in Table II, and again the magnitude of the A.N. is an indication of the sebum removing ability.

TABLE III

| Formulation: | A.N. |
|---|---|
| Detergent formulation—No. enzymically active material | 70 |
| Example I, 5% enzymically active material | 77 |

As can be seen from the above table, there is a significant improvement in the removal of natural sebum by the detergent containing the enzyme over the detergent that doesn't contain an enzyme. It will readily be appreciated that a detergent containing an enzyme can remove natural sebum from such hard to clean areas as shirt collars, cuffs and the like.

EXAMPLE IX

The same detergent formulation as set forth in Example I is prepared except the following enzymes produced by *Streptomyase rectus,* and *prolisin* are used. These formulations are tested for their ability to remove blood and the results of these tests are given in Table IV below. The formulations of Example I, which does not contain an agglomerated enzyme product is tested in the same manner.

TABLE IV

| Formulation: | ΔA.N. |
|---|---|
| Detergent formulation—No. enzyme | 9.6 |
| Example I+enzyme produced by *Streptomyase rectus* | 14.8 |
| Example I+enzyme produced by prolisin | 14.5 |

As can be seen from the above results, these detergent formulations readily remove blood and can be used to remove other soils of a protein, carbohydrate or fat nature.

What is claimed is:

1. A detergent additive in the form of agglomerated particles comprising a mixture of (1) an enzymically active material at a pH of from about 4 to 12 and (2) a maleic anhydride copolymer binding agent, said enzymically active material containing from about 1% to about 95% by weight of an enzyme selected from the group consisting of proteases, estereases, carbohydrases and proteases and mixtures thereof and from about 5% to about 99% of an inert material said inert material containing a detergent ingredient selected from the group consisting of inorganic builder salts, organic builder salts nonionic detergent actives, anionic detergent actives, cationic detergent actives and mixtures thereof; said binding agent being selected from the group consisting of olefin-maleic anhydride copolymers in which the olefin moiety contains from 2 to 20 carbon atoms, partially esterified olefin-maleic anhydride copolymers which are from 1 to 80% esterified with an alkanol having from 1 to 16 carbon atoms and in which the olefin moiety contains from 2 to 20 carbon atoms, vinylalkyl ether-maleic anhydride copolymers wherein the alkyl group contains from 1 to 3 carbon atoms, partially esterified vinylalkyl ether-maleic anhydride copolymers which are 1 to 80% esterified with an alkanol having from 1 to 16 carbon atoms and in which the alkyl group contains from 1 to 3 carbon atoms and mixtures of such copolymers and said binding agent being present in an amount from about 1% to about 25% by weight based on the weight of said enymatic active material and said detergent additive being a particle size so that 80% of the particles are smaller than the openings in a U.S. Standard 14 mesh screen and about 80% of the particles are larger than a U.S. Standard 100 mesh screen and said product having a bulk density of from about 0.25 to about 0.90 gram per cc.

2. A detergent additive according to claim 1 wherein said enzymically active material is one produced by a *Bacillus substilis* mutant NRRL No. B-3411.

3. A detergent additive according to claim 1 wherein said builder salt is selected from the group consisting of sodium tripolyphosphate, and sodium nitriloacetate.

4. A detergent additive according to claim 1 wherein said maleic and copolymer binding agent is selected from the group consisting of olefin-maleic anhydride copolymers in which the olefin moiety contains from 2–4 carbon atoms and from about 0.5% to about 1.5% by weight of vinyl crotonate as a cross-linking agent, partially esterified olefin-maleic anhydride copolymers which are from 40 to 60% esterified with an alkanol having from 1 to 6 carbon atoms, and in which the olefin moiety contains from 2 to 4 carbon atoms and substantially neutral amine salts, said alkyl group having 1 to 5 carbon atoms, of ethylene-maleic anhydride copolymers which are from about 40 to about 60% esterified with normal butyl alcohol.

5. A particulate detergent composition comprising from about .2% to about 30%, based on the weight of the detergent composition, of a product of claim 1 and from about 70% to about 99.8% based on the weight of the detergent composition, of a detergent mixture comprising an organic detergent active and a builder.

6. A composition of claim 5 wherein said organic active is selected from the group consisting of anionic, nonionic and cationic detergent active and said builder is selected from the group of inorganic builder salts, organic builder salts, organic sequestering salts, and mixtures thereof, the ratio of active to builder is from about 1:10 to about 10:1.

7. A composition of claim 6 wherein said organic active is sodium alkyl benzene sulfonate, the builder is sodium tripolyphosphate, and the composition has an active to builder ratio of from about 1:1 to about 1:7.

8. A method for producing an agglomerated detergent additive which comprises (1) mixing together a finely divided solid enzymically active material, said enzymically active material containing from about 1% to 95% of an enzyme selected from the group consisting of proteases, estereases, carbohydrases, proteases, and mixtures thereof and from about 5% to about 99% of an inert material containing a detergent ingredient selected from the group consisting of inorganic builder salts, organic builder salts, anionic detergent actives, non-anionic detergent actives, cationic detergent actives, and mixtures thereof and an organic solvent-binder mixture, in a weight ratio of about 0.1:1 to about 5:1, said solvent having a melting point below a temperature of about 60° C. and a vapor pressure of at least 1 millimeter of mercury at a temperature of about 60° C. said solvent-binder mixture containing a maleic anhydride copolymer binding agent selected from the group consisting of olefin-maleic anhydride copolymers in which the olefin moiety contains from 2 to 20 carbon atoms, partially esterified olefin maleic anhydride copolymers which are from about 1 to about 80% esterified with an alkanol having from 1 to 16 carbon atoms and in which the olefin moiety contains from 2 to 20 carbon atoms, vinyl alkyl ether-maleic anhydride copolymers wherein the alkyl group contains from 1 to 3 carbon atoms, partially esterified vinyl alkyl ether-maleic anhydride copolymers which are from about 1 to about 80% esterified with an alkanol having from 1 to 16 carbon atoms and in which the alkyl group contains from 1 to 3 carbon atoms and mixture of such copolymers, the amount of said solvent-binder mixture which is mixed together with the enzymically active material contains from about 0.1% to about 25% based on the weight of the enzymically active material of said binding agent and (2) thereafter removing said organic solvent by evaporation to thereby result in said detergent additive said detergent additive having a particle size so that about 80% of the particles are smaller than the openings in a U.S. Standard 14 mesh screen and about 80% of the particles are larger than the openings on a U.S. Standard 100 mesh screen and having a bulk density from about 0.25 to about 0.90 gram per cc.

9. A method according to claim 8 wherein the organic solvent is selected from the group consisting of alkyl alcohols having 1 to 5 carbon atoms, and partially esterified olefin maleic anhydride copolymers which are from about 40% to about 60% esterified with an alkanol having from 1 to 6 carbon atoms and in which the olefin moiety contains from 2 to 4 carbon atoms and substantially neutral amine salts, said alkyl groups having 1 to 5 carbon atoms, of ethylene-maleic anhydride copolymer which is from about 40 to about 60% esterified with normal butyl alcohol.

10. A method according to claim 8 where the finely divided solid enzymically active material is mixed with a solvent binder mixture in a weight ratio of about 0.5:1 to about 0.7:1 said solvent binder mixture containing maleic anhydride copolymer binding agent which is a substantially neutral alkyl amine salt, said amine having 1 to 5 carbon atoms in the alkyl group, of ethylene maleic anhydride copolymer which is from about 40 to about 60% esterified with normal butyl alcohol, the amount of said solvent binder mixture which is mixed together with an enzymically active material containing from about 4% to about 6% based on the weight of the enzymically active material of said binding agent and (2) thereafter remove said organic solvent by evaporation to thereby result in said agglomerated enzyme product.

11. A method according to claim 10 wherein said solvent binder mixture is mixed with said solid enzymically active material by spraying said solvent binder mixture onto said solid enzymically active material while said enzymically active material is being tumbled in a rotary blender.

References Cited
UNITED STATES PATENTS

| | | | |
|---|---|---|---|
| 3,039,107 | 6/1962 | Bradford | 159—48 |
| 3,436,309 | 4/1969 | Ottinger et al. | 195—63X |

LIONEL M. SHAPIRO, Primary Examiner

U.S. Cl. X.R.

195—63, 68

PO-1050
(5/69)

UNITED STATES PATENT OFFICE
CERTIFICATE OF CORRECTION

Patent No. 3,594,325         Dated July 20, 1971

Inventor(s) Harold E. Feierstein, Raymond L. Liss, and Noel L. Schomburg

It is certified that error appears in the above-identified patent and that said Letters Patent are hereby corrected as shown below:

Column 4, line 24, "of 10 to 1)" should read --of 10 to 11--.
Column 14, line 27, "20%" should read --10%--.
Column 15, line 57, the number now reading "16.6" should read --16.0--.
Column 17, line 3, the word "nitriloacetate" should read --nitrilotriacetate--.

Signed and sealed this 25th day of April 1972.

(SEAL)
Attest:

EDWARD M. FLETCHER, JR.
Attesting Officer

ROBERT GOTTSCHALK
Commissioner of Patents